United States Patent
Quinten et al.

(10) Patent No.: US 9,968,103 B2
(45) Date of Patent: May 15, 2018

(54) ARTIFICIAL FOOD CASING, METHOD FOR REMOVING AND METHOD FOR MANUFACTURING THEREOF

(71) Applicant: ViskoTeepak Belgium NV, Lommel (BE)

(72) Inventors: Johan Quinten, Lommel (BE); Marc Vrijsen, Zonhoven (BE); Jo Maes, Lommel (BE)

(73) Assignee: ViskoTeepak Belgium NV, Lommel (BE)

( * ) Notice: Subject to any disclaimer, the term of this patent is extended or adjusted under 35 U.S.C. 154(b) by 27 days.

(21) Appl. No.: 14/786,323

(22) PCT Filed: Apr. 17, 2014

(86) PCT No.: PCT/EP2014/057872
§ 371 (c)(1),
(2) Date: Oct. 22, 2015

(87) PCT Pub. No.: WO2014/173800
PCT Pub. Date: Oct. 30, 2014

(65) Prior Publication Data
US 2016/0143301 A1    May 26, 2016

(30) Foreign Application Priority Data

Apr. 23, 2013 (EP) .................................... 13164861
Sep. 20, 2013 (EP) .................................... 13185333

(51) Int. Cl.
*A22C 13/00* (2006.01)
*A22C 11/00* (2006.01)

(52) U.S. Cl.
CPC ........ *A22C 13/0013* (2013.01); *A22C 11/003* (2013.01); *A22C 13/00* (2013.01); *A22C 2013/002* (2013.01); *A22C 2013/0059* (2013.01); *A22C 2013/0079* (2013.01); *A22C 2013/0093* (2013.01); *A22C 2013/0096* (2013.01)

(58) Field of Classification Search
CPC ... A22C 13/0013; A22C 11/003; A22C 13/00; A22C 2013/002; A22C 2013/0059; A22C 2013/0079; A22C 2013/0093; A22C 2013/0096
See application file for complete search history.

(56) References Cited

U.S. PATENT DOCUMENTS

| 2,860,052 A | 11/1958 | Firth et al. |
| 2,949,371 A | 8/1960 | Freund et al. |
| 4,150,697 A | 4/1979 | Dowell et al. |
| 4,967,798 A * | 11/1990 | Hammer ............ A22C 13/0013 138/118.1 |
| 6,200,510 B1 | 3/2001 | DuCharme, Jr. et al. |
| 2012/0052223 A1 | 3/2012 | Wielockx et al. |

FOREIGN PATENT DOCUMENTS

| CN | 1297704 A | 6/2001 |
| CN | 1761702 A | 4/2006 |
| CN | 101039584 A | 9/2007 |
| CN | 102293414 A | 12/2011 |
| JP | 2005-350590 A | 12/2005 |

OTHER PUBLICATIONS

International Search Report for corresponding International Patent Application No. PCT/FI2014/057872 dated Jul. 31, 2014.
Extended European Search Report for corresponding European Patent Application No. 13164861.0 dated Oct. 1, 2013.
Extended European Search Report for corresponding European Patent Application No. 13185333.5 dated Oct. 14, 2013.
Chinese Office Action for corresponding Chinese Patent Application No. 201480023117.X dated Jun. 29, 2016, 6 pgs.
Japanese Office Action for corresponding Japanese Patent Application No. 2016-509401 dated Jan. 30, 2018, 3 pages, English translation.

* cited by examiner

Primary Examiner — Michael C Miggins
(74) Attorney, Agent, or Firm — Merchant & Gould P.C.

(57) ABSTRACT

The invention relates to an artificial food casing; method for removing said artificial food casing; and methods for manufacturing said artificial food casing.

17 Claims, No Drawings

ARTIFICIAL FOOD CASING, METHOD FOR REMOVING AND METHOD FOR MANUFACTURING THEREOF

This application is a National Stage Application of PCT/FI2014/057872, filed 17 Apr. 2014, which claims benefit of Ser. No. 13/164,861.0, filed 23 Apr. 2013 in Europe and Serial No. 13185333.5, filed 20 Sep. 2013 in Europe and which applications are incorporated herein by reference. To the extent appropriate, a claim of priority is made to each of the above disclosed applications.

FIELD OF THE INVENTION

The invention relates to an artificial food casing and to a method for removing said artificial food casing. The invention also relates to a method for manufacturing said artificial food casing.

BACKGROUND OF THE INVENTION

Food casings based on artificial materials such as cellulose, plastic and textile have been used for decades for the production of food products such as various types of sausages.

After preparation, e.g. filling and cooking, of a food product such as a sausage product, the artificial food casing containing non-edible material is removed by peeling the artificial food casing from the surface of the food product before the final food product is packaged. Automatic peelers are frequently used to peel the casing. For quality and food safety reasons, it is important that after peeling the casing is completely removed from the surface of the food product. Artificial food casings may, however, occasionally break during the peeling process, thus leaving fragments of artificial casing on the surface of the food product.

Artificial food casings, for instance plastic and cellulose-based casings, may be completely transparent when stuffed with meat emulsion or other materials of the food product, which makes it impossible to detect any fragments of casing that remain on the surface of the food product after peeling. Currently, coloured or striped casings, i.e. food casings comprising visible pigments, are often used to allow checking the quality of the peeling operation. Both types of casings, however, have disadvantages. If the casing is coloured, it is not possible to visually check or control the colour of the sausage during cooking or smoking. If the casing is striped, it is still possible that fragments of casing outside the area of the stripes remain on the surface of the food product and cannot be detected.

PURPOSE OF THE INVENTION

The purpose of the invention is to provide an artificial food casing, a method for removing the artificial food casing from the surface of a food product, and a method for manufacturing the artificial food casing.

SUMMARY

The invention relates to an artificial food casing.

DETAILED DESCRIPTION

Reference will now be made in detail to the embodiments of the present invention.

The present invention relates to an artificial food casing comprising an ultraviolet-detectable component.

In this context, the term "artificial food casing" should be understood as referring to a food casing suitable for a food product.

In one embodiment, the artificial food casing comprises regenerated cellulose.

In one embodiment, the artificial food casing is a cellulose-based food casing.

In one embodiment, the artificial food casing is a tubular cellulose-based food casing.

In one embodiment, the cellulose-based food casing comprises a fibrous reinforcement.

In one embodiment, the cellulose-based food casing comprises a fibrous reinforcement comprising an inside surface and an outside surface; and an outside layer on the outside surface of the fibrous reinforcement and/or an inside layer on the outside surface of the fibrous reinforcement; and the outside layer and/or the inside layer comprises regenerated cellulose.

In one embodiment, the artificial food casing comprises plastic.

In this context, the term "plastic" should be understood as referring to any type of plastic suitable for use in a food casing. Plastics such as polyamides or PVDC and mixtures thereof are commonly used in food casings.

In one embodiment, the artificial food casing comprises textile.

In this context, the term "textile" should be understood as referring to a textile comprising e.g. natural fibers, linen, silk, wool, modified natural fibers, synthetic fibers, or any mixtures thereof.

In one embodiment, the artificial food casing is tubular.

In this context, the term "ultraviolet-detectable component" should be understood as referring to any component that emits visible light when illuminated with an ultraviolet light source.

In one embodiment, the ultraviolet-detectable component is photoluminescent under ultraviolet light.

In one embodiment, the ultraviolet-detectable component is fluorescent under ultraviolet light.

The exact chemical composition of the ultraviolet-detectable component is not particularly limited. It may be e.g. a pigment, a dye, an ink, a chemical compound, a fluorophore or any combination thereof, provided that it is ultraviolet-detectable.

The ultraviolet-detectable component may be selected so that it fulfills any requirements concerning food safety.

In one embodiment, the ultraviolet-detectable component is an ultraviolet-detectable pigment.

In this context, the term "ultraviolet-detectable pigment" should be understood as referring to any pigment that emits visible light when illuminated with an ultraviolet light source.

In one embodiment, the ultraviolet-detectable pigment is photoluminescent under ultraviolet light.

In one embodiment, the ultraviolet-detectable pigment is fluorescent under ultraviolet light.

Various ultraviolet-detectable pigments are commercially available, for instance fluorescent pigments sold under the trade names Lumilux (e.g. Lumilux Yellow-orange CD 130, Red CD 106, Red CD 331, Blue CD 164, CWR C 120 R or Yellow CD 382) and RadGlo.

The ultraviolet-detectable pigment may be selected so that it fulfills any requirements concerning food safety.

In one embodiment, the ultraviolet-detectable pigment is an organic ultraviolet-detectable pigment.

In one embodiment, the ultraviolet-detectable pigment is a polyester/amide based pigment.

In one embodiment, the ultraviolet-detectable component or pigment is an optical brightener.

Optical brighteners, also known as optical brightening agents, are typically components such as dyes that absorb ultraviolet light and emit visible light in the blue region, typically at a wavelength in the range of 400 to 470 nm. Various optical brighteners are available, e.g. various benzoxazole, including bis(benzoxazole) and butylbenzoxazole, derivatives, stilbene derivatives and ethenyl derivatives. This embodiment has the advantage that optical brighteners are bright, readily available and cost-effective. Yet they are colourless or essentially colourless and cannot be detected with the human eye without illumination with an ultraviolet light source.

In this context, the term "optical brightener" should also be understood as including fluorescent whitening agents. The ultraviolet-detectable component may also be any mixture of an optical brightener and a fluorescent whitening agent.

In one embodiment, the optical brightener is a benzoxazole derivative.

In one embodiment, the optical brightener is 2,5-thiophenediylbis(5-tert-butyl-1,3-benzoxazole) (benzoxazole, 2,2'-(2,5-thiophenediyl)bis[5-(1,1-dimethylethyl)]-) or a derivative thereof.

In one embodiment, the artificial food casing comprises an ultraviolet-detectable pigment, an optical brightener, or a mixture thereof.

In one embodiment, the ultraviolet-detectable component is printed on the outside surface of the artificial food casing and/or on the inside surface of the artificial food casing.

The amount of the ultraviolet-detectable component may be adjusted so that it is sufficient to allow detecting visible light emitted by the ultraviolet-detectable component and subsequently locating any remaining fragments of the artificial food casing from the surface of the food product. The exact amount may be selected depending on the specific ultraviolet-detectable component.

In one embodiment, the artificial food casing comprises up to 10%, up to 5%, or up to 3%, or up to 2%, or up to 1% of the ultraviolet-detectable component by weight based on the total dry weight of the artificial food casing.

In one embodiment, the artificial food casing is a cellulose-based food casing and comprises up to 10%, up to 5%, or up to 3%, or up to 2%, or up to 1% of the ultraviolet-detectable component by weight based on the total dry weight of regenerated cellulose contained in the cellulose-based food casing.

In one embodiment, the artificial food casing comprises up to 10%, up to 5%, or up to 3%, or up to 2% of the ultraviolet-detectable pigment by weight based on the total dry weight of regenerated cellulose contained in the cellulose-based food casing.

In one embodiment, the artificial food casing comprises up to 10%, up to 5%, or up to 3%, or up to 2%, or up to 1% of the optical brightener, such as 2,5-thiophenediylbis(5-tert-butyl-1,3-benzoxazole), by weight based on the total dry weight of the artificial food casing.

In one embodiment, the artificial food casing is a cellulose-based food casing and comprises up to 10%, up to 5%, or up to 3%, or up to 2%, or up to 1% of the optical brightener, such as 2,5-thiophenediylbis(5-tert-butyl-1,3-benzoxazole), by weight based on the total dry weight of regenerated cellulose contained in the cellulose-based food casing.

In one embodiment, the artificial food casing comprises about 0.1-1%, or about 0.3-0.8%, or about 0.5-0.8%, or at least about 0.5%, or at least about 0.6%, or at least about 0.7%, or at least about 0.8% of the optical brightener, such as 2,5-thiophenediylbis(5-tert-butyl-1,3-benzoxazole), by weight based on the total dry weight of the artificial food casing.

In one embodiment, the artificial food casing is a cellulose-based food casing and comprises about 0.1-1%, or about 0.3-0.8%, or about 0.5-0.8%, or at least about 0.5%, or at least about 0.6%, or at least about 0.7%, or at least about 0.8% of the optical brightener, such as 2,5-thiophenediylbis(5-tert-butyl-1,3-benzoxazole), by weight based on the total dry weight of regenerated cellulose contained in the cellulose-based food casing.

In one embodiment, the artificial food casing or a portion thereof is further dyed or printed with a pigment. For instance, manufacturer logos, other visuals, text or other information may be printed or dyed on the casing. Printing or dying of portions of the artificial food casing may also improve the visual look of the artificial food casing or aid in the manufacturing and/or processing of the artificial food casing or any food products.

In one embodiment, the ultraviolet-detectable component extends substantially over the whole outside surface and/or the inside surface of the artificial food casing. This embodiment may be manufactured e.g. by printing substantially the whole outside surface and/or the inside surface of the artificial food casing with an ink comprising the ultraviolet-detectable component.

In one embodiment, the ultraviolet-detectable component extends substantially over the whole outside surface of the artificial food casing.

In one embodiment, the ultraviolet-detectable component extends substantially over the whole inside surface of the artificial food casing.

In one embodiment, the ultraviolet-detectable component is distributed throughout the artificial food casing. This embodiment may be manufactured e.g. by admixing the ultraviolet-detectable component with the material of the artificial food casing prior to extrusion of the artificial food casing.

In one embodiment, the ultraviolet-detectable component is distributed uniformly throughout the artificial food casing.

In one embodiment, the ultraviolet-detectable component is essentially colourless.

In one embodiment, the ultraviolet-detectable component is essentially colourless under daylight or ambient light conditions.

In this context, the term "daylight" should be understood as referring to direct or indirect sunlight outdoors during the daytime.

In this context, the term "ambient light conditions" should be understood as referring to general illumination in a room that is available naturally, e.g. daylight, or by artificial light, e.g. by light provided by lightbulbs or fluorescent lamps. In one embodiment, the artificial food casing is essentially transparent to visible light. This embodiment has the added utility that the colour of the food product is clearly visible through the artificial food casing and may thus be checked or controlled during the preparation, e.g. cooking or smoking, of the food product.

In one embodiment, the artificial food casing is essentially transparent to visible light when arranged on the surface of the food product.

In one embodiment, substantially the whole area of the artificial food casing is essentially transparent to visible light.

In one embodiment, the artificial food casing is essentially transparent in unshirred or uncompressed form.

In one embodiment, the maximum or average percent transmittance of visible light through the artificial food casing is higher than 50% T; or higher than 60% T; or higher than 70% T; or higher than 80% T; or higher than 85% T; or higher than 90% T; or higher than 95% T; or higher than 98% T.

The transmittance of an artificial food casing may be measured e.g. using a spectrophotometer suitable for films.

In one embodiment, the artificial food casing is essentially colourless.

In one embodiment, the artificial food casing is essentially colourless under daylight or ambient light conditions.

The colour of an artificial food casing may be measured e.g. using a densitometer suitable for films.

In one embodiment, the ultraviolet-detectable component and the artificial food casing are essentially colourless.

In one embodiment, the artificial food casing is a tubular cellulose-based food casing, and the ultraviolet-detectable pigment is a polyester/amide based pigment.

The present invention relates to a method for removing the artificial food casing according to one or more embodiments of the invention from the surface of a food product, comprising step a) peeling the artificial food casing from the surface of the food product;

step b) illuminating the surface of the food product obtainable from step a) with an ultraviolet light source;

step c) locating any remaining fragment of the artificial food casing on the surface of the food product by detecting visible light emitted by the ultraviolet-detectable component; and step d) removing any remaining fragment of the artificial food casing from the surface of the food product.

In the context of said method, the term "artificial food casing according to one or more embodiments of the invention" may refer to any of the embodiments of an artificial food casing comprising an ultraviolet-detectable component described herein.

In this context, the term "ultraviolet light source" should be understood as referring to any artificial source of ultraviolet light. Such an ultraviolet light source may be e.g. an ultraviolet lamp or a blacklight, a fluorescent lamp, a gas-discharge lamp, a LED or a laser emitting ultraviolet light.

Visible light emitted by the ultraviolet-detectable component may be detected visually, e.g. by an operator, or by a sensor.

In one embodiment, the method comprises the following steps in the following order:

step a) peeling the artificial food casing from the surface of the food product;

step b) illuminating the surface of the food product obtainable from step a) with an ultraviolet light source;

step c) locating any remaining fragment of the artificial food casing on the surface of the food product by detecting visible light emitted by the ultraviolet-detectable component; and step d) removing any remaining fragment of the artificial food casing from the surface of the food product.

In one embodiment, the method comprises step a) peeling the artificial food casing from the surface of the food product;

step b) illuminating the surface of the food product obtainable from step a) with an ultraviolet light source;

step c) locating any remaining fragment of the artificial food casing on the surface of the food product by detecting visible light emitted by the ultraviolet-detectable pigment; and step d) removing any remaining fragment of the artificial food casing from the surface of the food product.

In one embodiment, the method for removing the artificial food casing according to one or more embodiments of the invention from the surface of a food product comprises step a) filling the artificial food casing with the ingredients of the food product and optionally preparing the food product;

step b) peeling the artificial food casing from the surface the food product obtainable from step a);

step c) illuminating the surface of the food product obtainable from step b) with a ultraviolet light source;

step d) locating any remaining fragment of the artificial food casing on the surface of the food product by detecting visible light emitted by the ultraviolet-detectable component; and step e) removing any remaining fragment of the artificial food casing from the surface of the food product.

In one embodiment, the ingredients of the food product comprise a meat emulsion produced by grinding, mixing, chopping, and/or emulsifying meat and optionally other additives.

The preparing of the food product in step a) may comprise any of the steps of closing, linking and/or typing; smoking and/or cooking; and/or chilling the food product.

In one embodiment, the food product is a sausage product.

In one embodiment, the food product is a small sausage product. Small sausage products may include e.g. frankfurters, hot dogs, beer sausages, mini-salami and similar skinless sausages.

The invention also relates to a method for manufacturing the artificial food casing according to one or more embodiments of the invention, which method comprises step a) admixing the material of the artificial food casing and an ultraviolet-detectable component to obtain a mixture; and step b) extruding the mixture obtainable from step a) into an artificial food casing.

In one embodiment, the material of the artificial food casing comprises viscose.

In one embodiment, the material of the artificial food casing comprises plastic.

In one embodiment, the method for manufacturing a cellulose-based food casing according to one or more embodiments of the invention comprises step a) admixing viscose and an ultraviolet-detectable component to obtain a mixture; and step b) extruding the mixture obtained in step a) into a cellulose-based food casing.

It should be understood that in the context of the method for manufacturing the artificial food casing or of the method for removing the artificial food casing, the ultraviolet-detectable component may be any ultraviolet-detectable component described herein. In one embodiment, the ultraviolet-detectable component is an ultraviolet-detectable pigment. In one embodiment, the ultraviolet-detectable component is an optical brightener.

In one embodiment, the method for manufacturing a tubular cellulose-based food casing according to one or more embodiments of the invention comprises step a) admixing viscose and an ultraviolet-detectable component to obtain a mixture; and step b) extruding the mixture obtained in step a) into a tubular cellulose-based food casing.

In one embodiment, the method further comprises the step of step c) coagulating and washing the cellulose-based food casing obtainable from step b).

In one embodiment, the method further comprises the step of step c) coagulating and washing the tubular cellulose-based food casing obtainable from step b).

In one embodiment, the method further comprises the step of step d) drying and/or curing the cellulose-based food casing obtainable from step c).

In one embodiment, the method further comprises the step of step d) drying and/or curing the tubular cellulose-based food casing obtainable from step c).

The present invention further relates to a method for manufacturing the artificial food casing according to one or more embodiments of the invention, wherein the method comprises step a) extruding a mixture comprising the material of the artificial food casing into an artificial food casing; and step b) printing the outside and/or inside surface of the artificial food casing obtainable from step a) with an ultraviolet-detectable component.

It should be understood that in the context of the method for manufacturing the artificial food casing, the ultraviolet-detectable component may be any ultraviolet-detectable component described herein. In one embodiment, the ultraviolet-detectable component is an ultraviolet-detectable pigment. In one embodiment, the ultraviolet-detectable component is an optical brightener.

Methods of printing food casings with inks are well known in the art.

In one embodiment, the material of the artificial food casing comprises viscose.

In one embodiment, the material of the artificial food casing comprises plastic.

The present invention further relates to a cellulose-based food casing obtainable by the method for manufacturing according to one or more embodiments of the invention.

The embodiments of the present invention have several advantages. Any remaining fragments of an artificial food casing comprising an ultraviolet-detectable component are easy to detect and locate using ultraviolet light after peeling the artificial food casing from the surface of the food product. This can be done either visually by an operator, or the detection may be automated using a suitable sensor apparatus. Any remaining fragment of the artificial food casing thus located may subsequently be removed from the surface of the food product. Since there is no need to include a coloured pigment in the artificial food casing, it is possible to properly evaluate the smoking and cooking of the food product during processing. Furthermore, the ultraviolet-detectable component does not interfere with any of the steps involved in the manufacture and processing of the artificial food casing and/or the food product produced therewith.

The embodiments of the invention described hereinbefore may be used in any combination with each other. Several of the embodiments may be combined together to form a further embodiment of the invention. A product, a method or a use, to which the invention is related, may comprise at least one of the embodiments of the invention described hereinbefore.

EXAMPLES

In the following, the present invention will be described in more detail. The description below discloses some embodiments and examples of the invention in such detail that a person skilled in the art is able to utilize the invention based on the disclosure. Not all steps of the embodiments are discussed in detail, as many of the steps will be obvious for the person skilled in the art based on this specification. The following examples were carried out in a small-scale testing laboratory; however, a person skilled in the art is able to scale the examples as desired.

Example 1

A tubular cellulose-based food casing was manufactured by admixing viscose with a composition comprising an organic pigment detectable under ultraviolet light provided under the trade name RadGlo and by extruding the mixture comprising viscose and the organic pigment into a tubular cellulose-based food casing. The tubular cellulose-based food casing was subsequently treated by coagulation, regeneration, washing and drying steps using known methods.

Another tubular cellulose-based food casing prepared as above comprised 1.87% of the composition comprising the organic pigment (1.57% of the organic pigment and 0.3% of additives present in the composition) by weight based on the total dry weight of regenerated cellulose contained in the cellulose-based food casing.

Example 2

A tubular cellulose-based food casing was manufactured by extruding a mixture comprising viscose into a tubular cellulose-based food casing. The tubular cellulose-based food casing was subsequently treated by coagulation, regeneration, washing and drying steps using known methods.

A composition comprising the organic pigment detectable under ultraviolet light was dissolved in a clear non-ultraviolet detectable lacquer so that the solution comprised 4% of the organic pigment by weight based on the total weight of the solution comprising the organic pigment composition and the clear non-ultraviolet detectable lacquer.

The solution was printed onto the surface of the tubular cellulose-based food casing with a coverage of 2 cc/m$^2$ using known methods.

Example 3

The colour of an artificial casing prepared as described in Example 1 was measured using a Hunterlab MiniScan XE Plus spectrophotometer according to the manufacturer's instructions. The following values were recorded in a single sided measurement:

L value: 97.1
a value: −2.01
b value: 2.01

Example 4

The transmittance of an artificial casing prepared as described in Example 1 was measured using an X-Rite 361T transmission densitometer. An optical density value of 0.02

D was recorded, corresponding to a transmission % of approx. 95.5%. For comparison purposes, the optical density value of a corresponding coloured (blue) casing was 0.4 D, corresponding to a transmission % of approx. 39.8%.

Example 5

An aqueous dispersion with 7.25% of optical brightener (2,5-thiophenediylbis(5-tert-butyl-1,3-benzoxazole), MPI Bright 100 from MPI Chemie BV, the Netherlands) was prepared and maintained with constant stirring.

A tubular cellulose-based food casing comprising 0.8% optical brightener by weight based on the weight of dry substance present in the cellulose-based food casing was prepared. The aqueous dispersion of optical brightener was injected into the viscose during the manufacture of the cellulose-based food casing through a color mixer (flow: 10 cc/min.); the cellulose-based food casing was otherwise manufactured as described above.

During and after extrusion of the viscose, the optical brightener was not visible in the casing.

After drying, the cellulose-based casing had a slightly milky appearance.

Example 6

A tubular cellulose-based food casing comprising 0.5% optical brightener by weight based on the weight of dry substance present in the cellulose-based food casing was prepared as described in Example 5. The dispersion was injected into the viscose through a color mixer (flow: 6 cc/min.); the cellulose-based food casing was otherwise manufactured as described above.

During and after extrusion of the viscose, the optical brightener was not visible in the casing.

After drying, the cellulose-based food casing had a slightly milky appearance.

Example 7

Fluorescence was clearly visible when the cellulose-based food casing prepared in Example 5 was placed under a UV light. Also, fluorescence was clearly visible when the cellulose-based food casing prepared in Example 6 was placed under the UV light. The UV light had no effect on a reference casing (a comparable cellulose-based food casing which did not comprise an ultraviolet-detectable component).

After stuffing with meat, it was not possible to detect the cellulose-based food casings prepared in Examples 5 and 6 with the human eye without illumination using an UV light.

The cellulose-based food casings prepared in Examples 5 and 6 were detected using an UV sensor (Keyence). The UV sensor gave a reading of 200 for the reference casing. For cellulose-based food casings with a UV component (prepared as described in Examples 1 and 2) the UV sensor gave a reading of 1400. The casing prepared in Example 6 gave a reading of 1600. The casing prepared in Example 5 with 0.8% optical brightener even gave readings of 4000. The difference between the readings from cellulose-based food casings prepared in Examples 5 and 6 and the reference casing are large enough to allow detection with the UV sensor or a camera.

Tests with the same cellulose-based food casings stuffed with sausage gave readings that were somewhat lower but still sufficient for detection with an UV sensor or a camera.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A tubular artificial food casing comprising an ultraviolet-detectable component, where ultraviolet-detectable component is distributed throughout the tubular artificial food casing.

2. The tubular artificial food casing according to claim 1, wherein the tubular artificial food casing comprises regenerated cellulose, plastic, or textile.

3. The tubular artificial food casing according to claim 1, wherein the tubular artificial food casing is a cellulose-based food casing.

4. The tubular artificial food casing according to claim 1, wherein the tubular artificial food casing comprises a fibrous reinforcement comprising an inside surface and an outside surface; and an outside layer on the outside surface of the fibrous reinforcement and/or an inside layer on the inside surface of the fibrous reinforcement; and the outside layer and/or the inside layer comprises regenerated cellulose.

5. The tubular artificial food casing according to claim 1, wherein the ultraviolet-detectable component is photoluminescent or fluorescent under ultraviolet light.

6. The tubular artificial food casing according to claim 1, wherein the ultraviolet-detectable component extends substantially over the whole outside surface and/or the inside surface of the artificial food casing.

7. The tubular artificial food casing according to claim 1, wherein the tubular artificial food casing is essentially transparent to visible light.

8. The tubular artificial food casing according to claim 1, wherein the ultraviolet-detectable component and/or the artificial food casing is essentially colourless.

9. The tubular artificial food casing according to claim 1, wherein the ultraviolet-detectable component is an ultraviolet-detectable pigment.

10. The tubular artificial food casing according to claim 1, wherein the ultraviolet-detectable component is an optical brightener.

11. A tubular artificial food casing comprising an ultraviolet-detectable component, wherein the tubular artificial food casing has a whole outside surface and a whole inside surface, and wherein the ultraviolet-detectable component extends substantially over the whole outside surface and/or the whole inside surface of the artificial food casing.

12. The tubular artificial food casing according to claim 11, wherein the tubular artificial food casing is a cellulose-based food casing.

13. The tubular artificial food casing according to claim 11, wherein the ultraviolet-detectable component is photoluminescent or fluorescent under ultraviolet light.

14. The tubular artificial food casing according to claim 11, wherein the tubular artificial food casing is essentially transparent to visible light.

15. The tubular artificial food casing according to claim 11, wherein the ultraviolet-detectable component and/or the artificial food casing is essentially colourless.

16. The tubular artificial food casing according to claim 11, wherein the ultraviolet-detectable component is an ultraviolet-detectable pigment.

17. The tubular artificial food casing according to claim 11, wherein the ultraviolet-detectable component is an optical brightener.

* * * * *